United States Patent [19]  
Linder

[11] 4,144,756  
[45] Mar. 20, 1979

[54] ELECTROMAGNETIC MEASUREMENT OF QUANTITIES IN CONNECTION WITH ELECTRICALLY CONDUCTING LIQUID MATERIAL

[75] Inventor: Sten V. Linder, Tystberga, Sweden

[73] Assignee: Aktiebolaget Atomenergi, Stockholm, Sweden

[21] Appl. No.: 797,654

[22] Filed: May 17, 1977

[30] Foreign Application Priority Data

May 20, 1976 [SE] Sweden .............................. 7605759

[51] Int. Cl.² .............................................. G01F 23/00
[52] U.S. Cl. ................................................. 73/290 R
[58] Field of Search ......................... 73/290 R, 304 R; 323/75 S; 336/170

[56] References Cited  
U.S. PATENT DOCUMENTS

| | | | |
|---|---|---|---|
| 2,680,968 | 6/1954 | Cockett | 73/304 R X |
| 3,678,748 | 7/1972 | Dziedzic | 73/290 R |
| 3,962,919 | 6/1976 | Playfoot et al. | 73/290 R |
| 4,007,636 | 2/1977 | Wahl | 73/290 R |

Primary Examiner—Jerry W. Myracle  
Attorney, Agent, or Firm—Burns, Doane, Swecker & Mathis

[57] ABSTRACT

A system for electromagnetically measuring level, distance or flow rate in connection with molten metal contained in a furnace, mould, channel or the like. Separate coreless single or few-turn transmitter and receiver coils are used, the coils being essentially freely positionable relative to the walls of the furnace etc. At least two signal channels are included for signal processing and for producing counteraction between transmitter and/or receiver signals so as to produce a basic measurement signal that is at least substantially balanced with regard to disturbing and unbalance signals, whereby the small variations of the signals induced in the receiver coil or coils due to changes of the level, distance or flow rate of the molten metal can be accurately detected.

39 Claims, 14 Drawing Figures

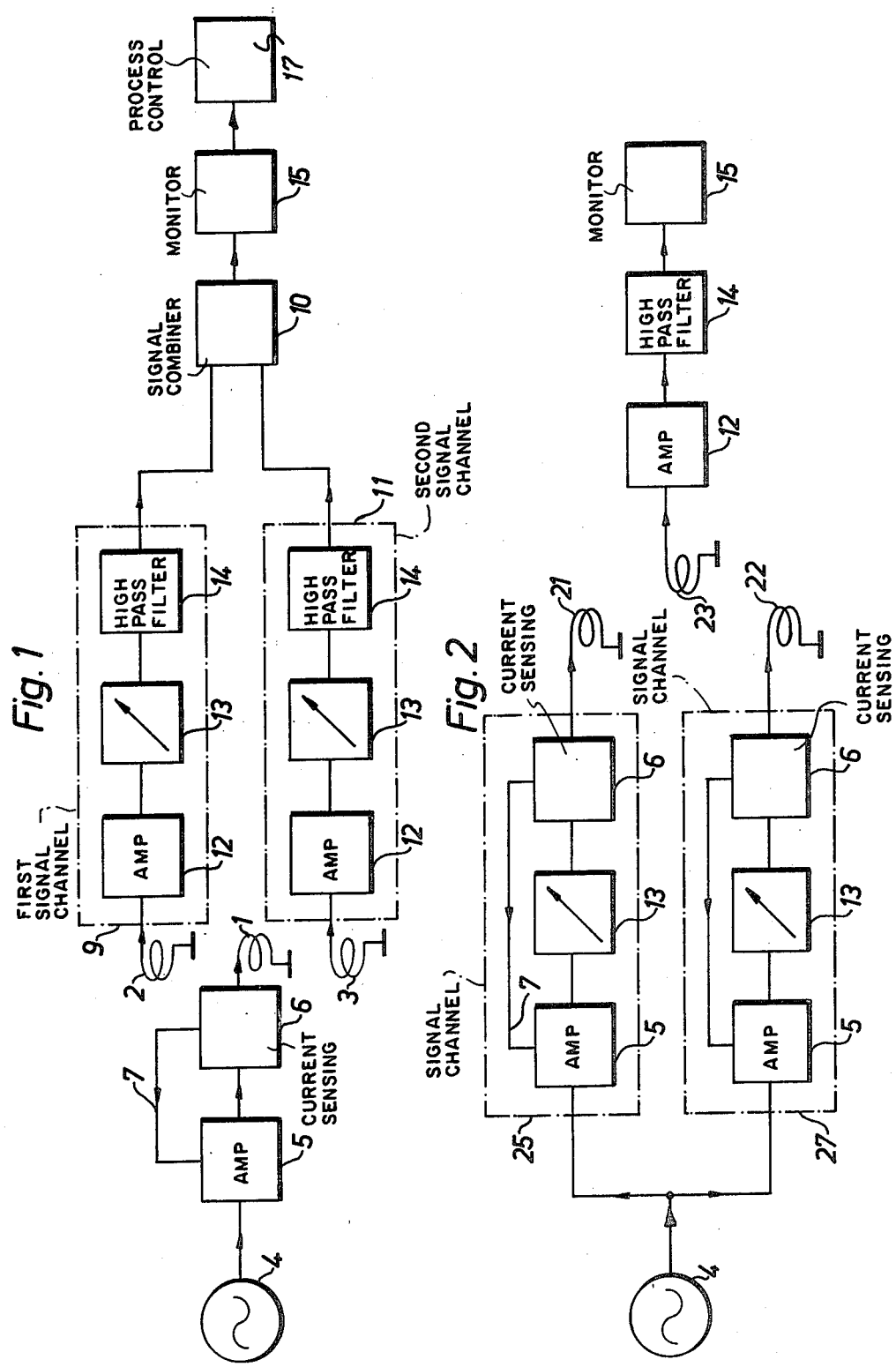

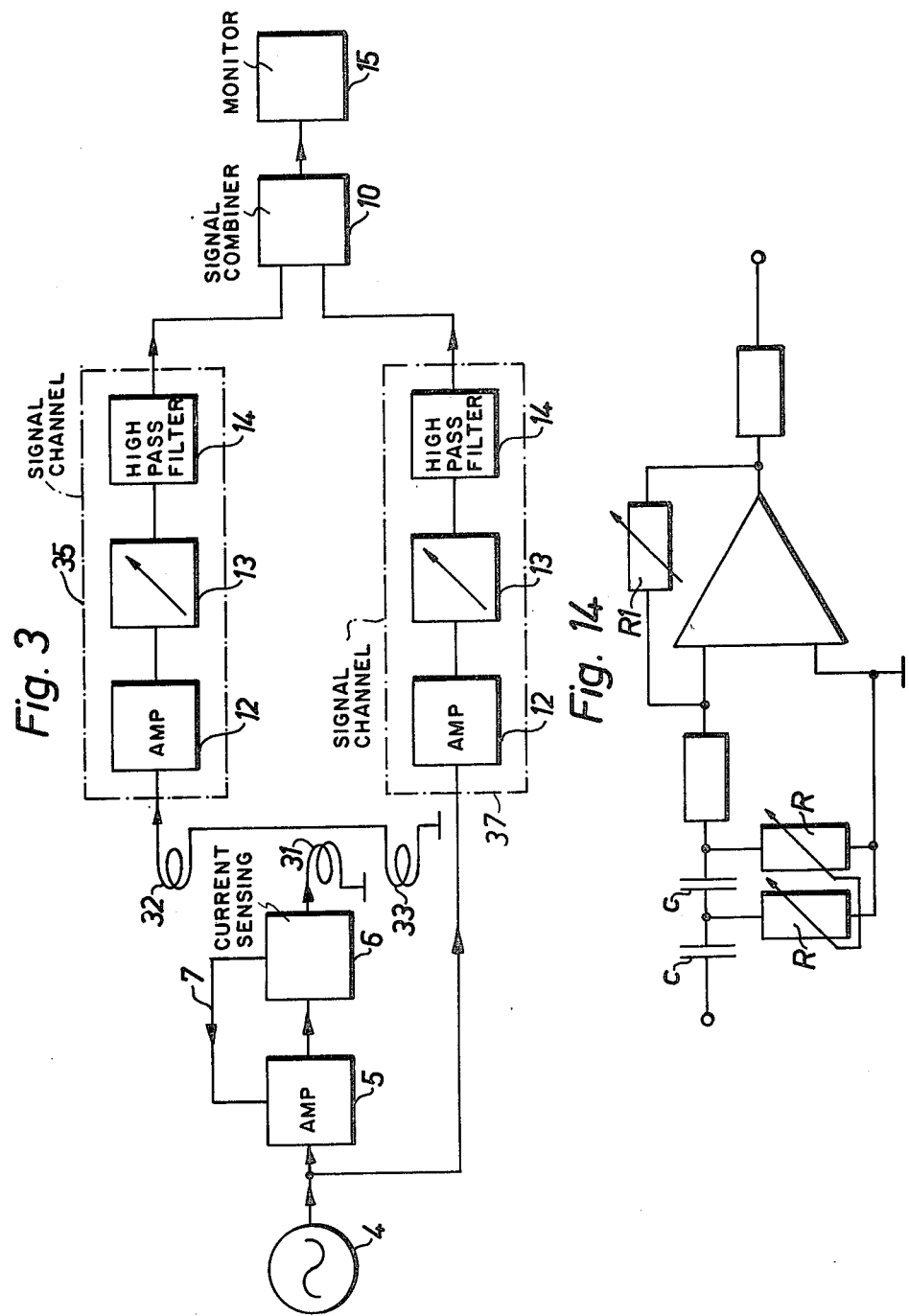

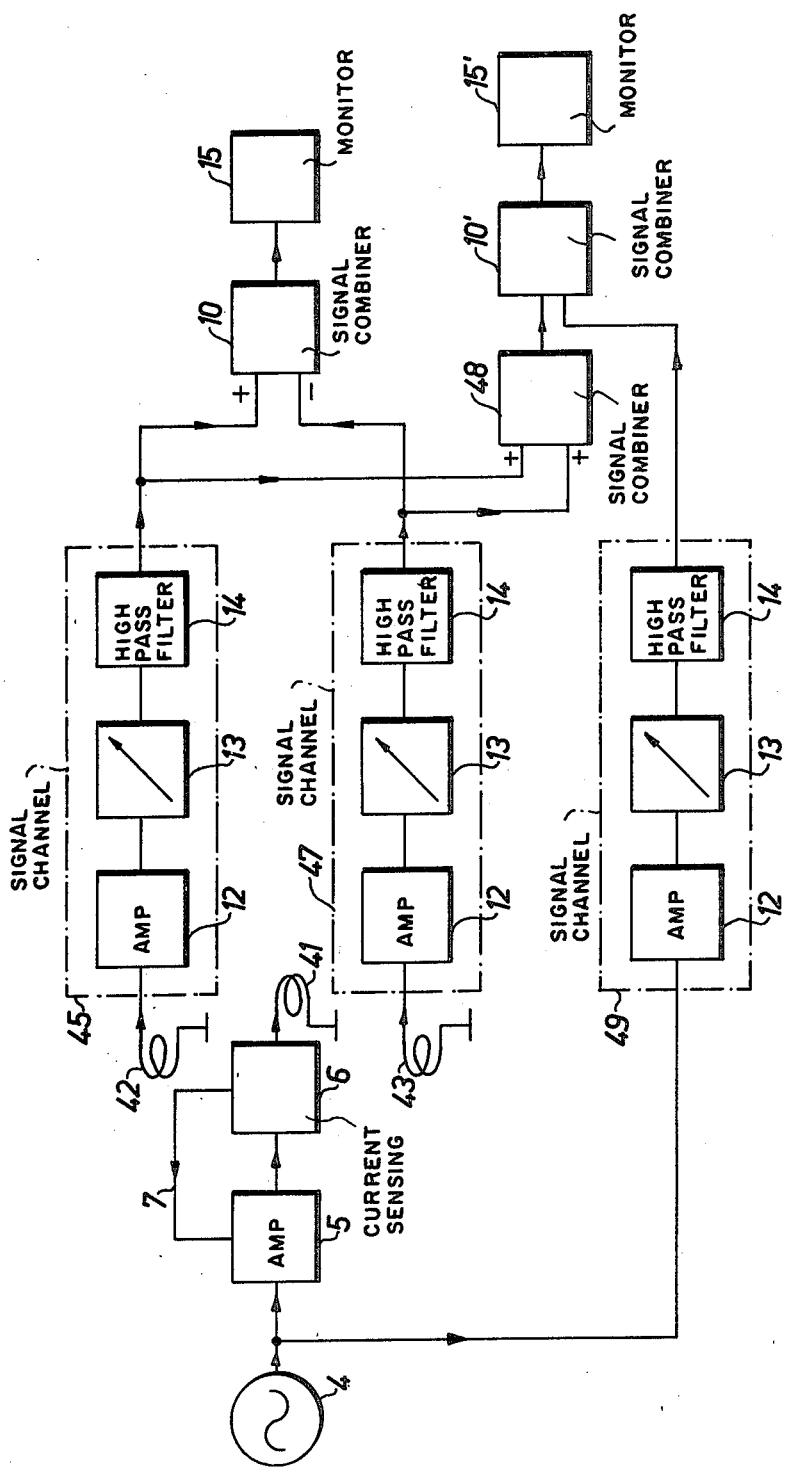

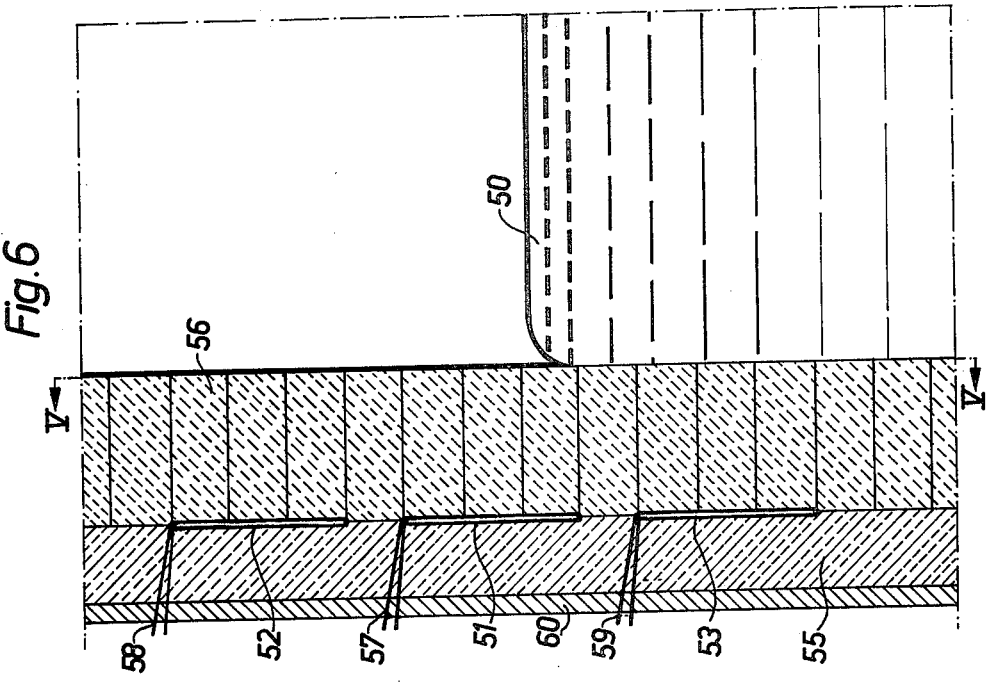
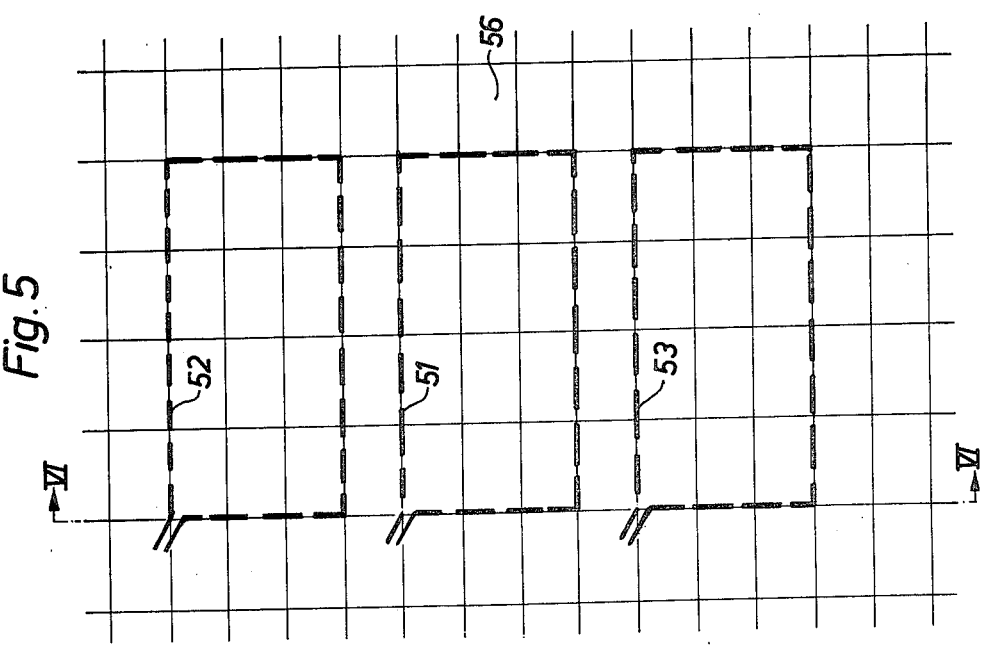

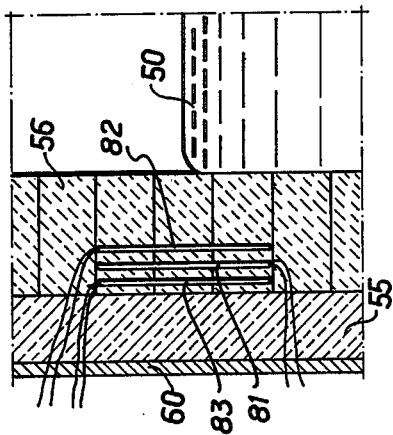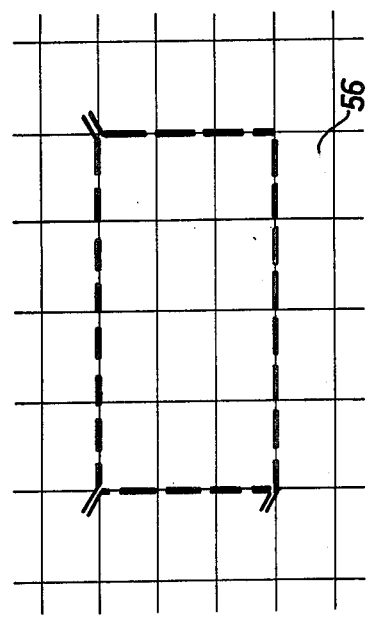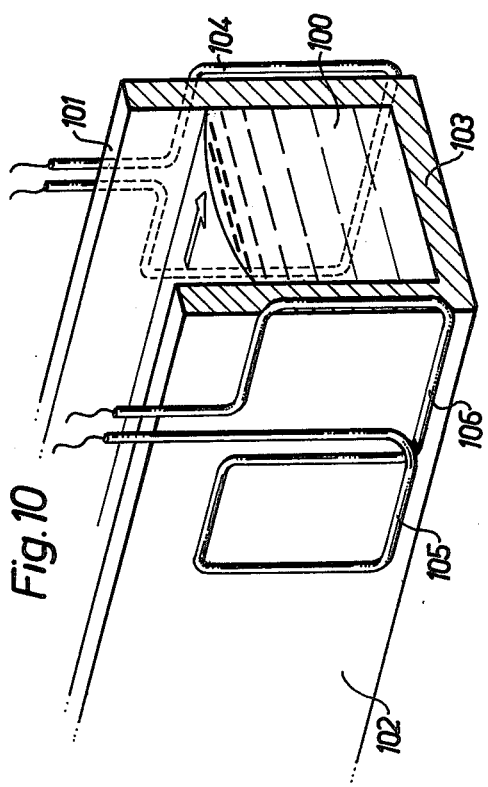

4,144,756

ELECTROMAGNETIC MEASUREMENT OF QUANTITIES IN CONNECTION WITH ELECTRICALLY CONDUCTING LIQUID MATERIAL

CROSS REFERENCE TO RELATED APPLICATIONS

This application is related to the following applications all of which were filed on even date herewith and all of which are incorporated by reference herein: ELECTROMAGNETIC MEASUREMENT OF LEVEL AND/OR DISTANCE FOR ELECTRICALLY CONDUCTING LIQUID MATERIAL, U.S. Ser. No. 797,656; and COIL ARRANGEMENT FOR ELECTROMAGNETIC MEASUREMENTS; U.S. Ser. No. 797,655. This invention relates to electromagnetic measurement at high temperatures of one or more of the quantities of level, distance and rate or velocity in connection with a liquid electrically conducrting material contained in a container, channel or the like. More particularly, the invention relates to an arrangement for such measurement which arrangement is specifically suitable for use in connection with electrically conducting molten material of a very high temperature, such as molten metal, and which arrangement comprises an AC power supply for supplying a transmitter signal, at least one transmitter coil arranged to be supplied with a transmitter signal from the AC power supply for producing an alternating magnetic field, at least one receiver coil arranged to sense the alternating magnetic field and to generate a receiver signal in dependence thereon, said coils being arranged in association with a wall of said container, channel or the like so that the alternating magnetic field sensed by at least one receiver coil varies in accordance with at least one of the above-mentioned quantities, and means connected to said at least one receiver coil for detecting said receiver signal to produce a measurement signal. In this connection "wall" is intended to have a very broad meaning. Thus, the expression includes both outward limiting members, for instance side walls, bottom walls and roof walls, and inward limiting members, for instance side walls and bottom walls of a centre post, control rod or the like which is located in or depends into a room.

In industries, primarily metallurgical industries, in which molten liquid electrically conducting material is handled, there is a great need for arrangements for measuring the level of the liquid material in containers such as torpedo ladle wagons, moulds for continuos casting, furnaces or ladles, etc. Lately, this need has been accentuated because of a change to a large extent into continuous processes and into processes upon which great demands of control are made. Due to the specific hard conditions met in connection with such industry, such as high temperatures, corrosive materials, the occurrance of much iron and other electrically conducting materials in the containers and surroundings, etc, up to now it has proved to be most difficult to provide a desirable measurement, in particular electromagnetically.

Nevertheless, arrangements for electromagnetic measurement of level in connection with melting furnaces have been proposed which comprise three coils arranged on an E-shaped iron or ferromagnetic core, the core being arranged in a specific recess in the lined wall of the furnace in a direct connection to the contained melt. However, in practice such arrangements have proved to be associated with difficult problems, especially due to the high temperature and the cooling required thereby, and to have poor reliability although the price is high. Also, the necessity of using a continuous iron or ferro-magnetic core means problems as to the dimensions and location of the coils and adaptation of the coils to various measuring purposes. Therefore, such arrangements have not been commonly used.

In industries of the kind discussed there is also a great need for arrangements for measuring and indicating the often very rapid wear and erosion of the linings of a refractory material which in most cases are found within the container containing the liquid electrically conducting material, because it is of great importance from the safety point of view and also from the economic point of view, to be able to determine exactly when the container must be taken out of operation and be provided with a new lining.

For this purpose it has been proposed to insert elements into the lining, for instance thermoelectric couples or conductor loops arranged stepwise which are destroyed as the wear and erosion proceeds, thereby causing electrically detectable conditions indicating how far the wear and erosion has proceeded.

However, these solutions have many drawbacks, such as that the elements inserted must be replaced when exchanging the lining, that a plurality of elements and a related great number of lead-in wires are involved which among other things requires a substantial connecting system, that other phenomena than those intended influence the measurements, etc. Therefore, arrangements of the above-mentioned types have not been largely used either.

Particularly in industries of the kind discussed there is also a great need for arrangements for measuring flow velocity and rate in connection with flowing liquid electrically conducting material, for instance in a channel, specifically for control purposes. Up to now, no satisfactory electromagnetically operating arrangements of this type have been presented.

Therefore, the object of this invention is to provide a novel improved arrangement of the kind stated in the introductory paragraph which among other things makes it possible to measure one or more of the quantities of level, distance (particularly wear and erosion) and rate or velocity (particularly flow rate or velocity); uses simple and easily positioned and, generally speaking, resistive elements in association with the liquid electrically conducting material, so that a long working life is obtained also in connection with frequent exchange of lining when the elements are positioned therein; has a great flexibility which makes it easily adaptable to different applications; gives exact and easily readable measurement values; and also otherwise lacks the drawbacks discussed above.

The above-mentioned object is achieved by the arrangement of the invention having been given the features defined in the appended claims.

Thus, the arrangement of the invention is essentially characterized in that it comprises the combination of single or few-turn coreless transmitter and receiver coils which preferably are separate and which are freely positionable in an adaptation to the measuring problem or purpose, and at least two signal channels, each of said signal channel being arranged to transfer or pass a transmitter or a receiver signal and at least one of said signal channels including signal processing means for and/or amplitude adjustment of the signal transferred by the signal channel, and means for producing counteraction between the signals transferred by the signal channels so that when the liquid electrically conducting material is in a basic position and when said signal processing means are properly adjusted the basic measurement signal obtained is at least substantially balanced with regard to disturbing and unbalance signals. It has been found that such a balancing operation makes it possible to detect very small signal variations with extremely good accuracy and reliability, the signal variations being due to changes of the above-mentioned quantities and otherwise being very difficult to discriminate. In its turn, this has been found to make possible the use of the extremely simple coils according to the invention.

With the word "coreless" it is to be understood also that the coils do not surround the liquid electrically conducting material in such a way that the material constitutes a coil core.

With the word "separate" it is to be understood that in principle the coils are not mechanically attached to each other, but can be arranged at various distances from each other. This makes it possible, among other things, to choose a location that is most favourable with regard to obtaining maximal magnetic field variations at the receiver coil or coils when measuring.

Preferably, each coil includes only a single turn of a coil lead which can include one or a few conductors inside an outer protecting sheath which will be described in more detail later on.

According to the invention the above-mentioned conteraction can be obtained primarily in accordance with any of three main principles. According to a first main principle a first signal channel transfers a receiver signal from at least one receiver coil and a second signal channel transfers a transmitter signal from the transmitter side of the arrangement, the transferred signals then being combined. According to a second main principle a first signal channel transfers a first receiver signal from at least one first receiver coil and a second signal channel transfers a second receiver signal from at least one second receiver coil, the transferred signals then being combined. In this respect, as to both the first main principle and the second main principle, said means for producing counteraction and said means for producing a measurement signal suitably can include combining means for combining the signals transferred through the signal channels and processed in at least one of the signal channels so that a difference signal representing a measurement signal is obtained. According to the third main principle a first signal channel transfers a first transmitter signal to at least one first transmitter coil and a second signal channel transfers a second transmitter signal to at least one second transmitter coil, the transmitter signal supplies to the transmitter coils and/or the transmitter coils being arranged so that the alternating magnetic fields produced by the transmitter coils counteract each other in at least one receiver coil, said means for detecting a receiver signal being connected to said at least one receiver coil.

As to the second and the third main principles, it can thus be said that the receiver and the transmitter coils, respectively, are connected for counteraction in opposition, even if the action producing the difference signal and falling within the expression "for counteraction or in opposition" is dependent on processing or combining signals outside the coils. Analogously, in the following it will be stated that coils are connected for coaction or positive interaction when signals associated with the coils co-operate or are added no matter whether or not such action occurs directly at the coils.

It should be understood that when an expression such as "at least one coil" (transmitter or receiver coil) has been used above this can mean two or more in most cases symmetrically positioned coils which are connected for coaction or counteraction, possibly while using additional signal channels.

Also, it should be understood that in one and the same arrangement according to invention it is possible to apply more than one of the above-mentioned main principles by combining one and the same set of transmitter and receiver coils with completely or partially multiplied sets of signal channels and/or signal combining means in order to make possible a simultaneous or easily switchable measurement of two different optional quantities. In such a case it can be suitable to have an AC power supply which supplies signals of different frequencies for the different measurement purposes. Also, frequency selective means can be provided particularly in signal channels or signal paths of the receiver side of the arrangement which are not common.

Advantageously, frequency selective means such as high or band pass filters having cut-off frequencies matching the frequency of the AC power supply can be provided in signal channels or paths of the receiver side of the arrangement also when measuring only one quantity. Suitably, the frequency of the AC power supply is of the order of 1–10 kHz. However, the frequency should not be so low that interference or disturbing signals having the line frequency of 50 Hz or the double line frequency of 100 Hz have influence on the measurements. Also, the frequency used should be adapted to a desired depth of penetration of the alternating magnetic field. Consequently a very low frequency can be suitable when the alternating magnetic field produced has to pass through much metal screening the liquid electrically conducting material to be measured upon or when flow rate is to be measured, that is, when the alternating magnetic field should penetrate the entire flowing mass of material.

In order to obtain reproducable measurement results it is of importance that the alternating magnetic field produced by one or more transmitter coils does not vary as to its strength, not even at varying operating conditions, for instance at varying temperature. For this purpose the AC power supply suitably is arranged for constant current supply of the transmitter coil or coils, whereby the influence of for instance a varying resistance of a transmitter coil due to a varying temperature is eliminated, because the strength of the alternating magnetic field produced by said coil is proportional to the product of the inductive resistance of the coil and the current strength.

As mentioned, the specific transmitter and receiver coils used in accordance with this invention are coreless and each include merely one or a few conductor turns. This means that several difficult problems are removed which are associated with the location of the coils at high temperature applications. Thus, problems as to the insulation between coil turns are avoided which are due to thermally caused displacements of coil turns relative to each other and to precipitation of carbon when positioned or adjacent to a brick lining. Also, the coil can have a very simple design and can have an optical planar or three-dimensional configuration, for instance square, triangular, circular etc, according to desire and suitability. This means that the coils very easily can be arranged within or behind a refractory lining, for instance. Advantageously, the coils can be arranged so that the conductors or turns of the coils are located in the joints between the separate bricks of the lining. Furthermore, the coils easily can be positioned in specially made grooves or recesses in one or more bricks. Pre-fabricated brick elements with inserted coils can also be used. The simple design also makes it possible to give the coils a substantial size without the coils being unhandy, and to have the coils positioned or installed by the personnel who normally provide the container, channel or the like with its lining. In other words, the installation of the coils can be adapted to the bricklaying technique.

Advantageously, the coils are encased in an electrically conducting sheath while being insulated therefrom, the sheath being non-short-circuiting and preferably non-magnetic. The sheath can be grounded. The sheath is preferably tubular and can be made of a stainless steel or any other high temperature resistive material. The insulation inside the sheath suitably is made of a ceramic material. A design of this type makes the coils very resistive in a general sense, as well as mechanically rigid and electrically screened, so that the sensitivity to electrical disturbances is still more reduced.

It should be understood, that a sheath of the type mentioned above can encase or surround a number of coil turns or conductors which can be part of one or several separate coils. Thus, it is possible to encase in one and the same sheath all transmitter and/or receiver coils of an arrangement in accordance with the invention. The encased conductors advantageously can be tubular and coaxial but for a solid centre conductor.

It has been found suitable to have no more than 7 encased conductors, preferably 1, 2 or 4 conductors.

It should be understood that an outer sheath of the type mentioned above also can constitute coil conductor(s) or coil turn(s) of transmitter or receiver coils. When the sheath comprises several turns, the sheath can be divided at the centre thereof to form two coils following one after the other. The different resistances of the coil conductors which can follow from a transmitter coil construction of the above-mentioned type do not result in any problem when the technique of constant current supply described previously is used.

As stated previously, when using the present invention the location of transmitter and receiver coils, even with respect to each other, becomes optional within the limits of the fact that the alternating magnetic field sensed by one or more receiver coils used has to vary with the quantity or the quantities to be measured. Preferably, the transmitter and receiver coils are located symmetrically with respect to each other and symmetrically with respect to the liquid electrically conducting material although this is not necessary in view of the specific signal processing in accordance with the invention.

However, as to the location of the transmitter and receiver coils some advantageous main alternatives should be pointed out.

According to a first main alternative the coils are arranged separately and in spaced relation in association with and preferably within a wall, the spaced axes of the coils being directed into the container, channel or the like.

When measuring level (that is, the wall is vertical in principle) the coils are then located above each other as to height position in order to provide for unsymmetrical alternating magnetic field influence as the level of the liquid electrically conducting material varies along the wall. In this case the coils include at least three coils, two of which are receiver coils connected for counteraction and one of which is a transmitter coil or alternatively two of which are transmitter coils connected for counteraction and one of which is a receiver coil. Suitably, the transmitter coil or alternatively the receiver coil is located between the two coils connected for counteraction with respect to height position. The signal processing is then suitably performed in accordance with the above-mentioned second or third main principle, respectively. The adjustment to give a balanced basic measurement signal is suitably performed either at a very low level of the liquid electrically conducting material (measurement of a high level in connection with a filling operation, for instance) or at a normal level of the liquid electrically conducting material (measurement of a low level in connection with a tapping operation, for instance).

When measuring distance (particularly wear and erosion) the location is completely optional with the reservation that the receiver coil or coils should to an extent as great as possible sense the alternating magnetic field produced by the transmitter coil or coils and the changes thereof due to a changed distance to the liquid electrically conducting material. If there are several transmitter or alternatively receiver coils, said coils are connected for coaction. When measuring wear and erosion, suitably the coils are located so that when the liquid electrically conducting material is at a normal level the coils are substantially completely "covered" by the material. When located in a roof wall distance measurement can mean level measurement. The signal processing suitably is performed in accordance with the above-mentioned first main principle, the adjustment to give a balanced basic measurement signal then suitably being performed at a normal level of the material in connection with measurement of wear and erosion.

When measuring rate or velocity the coils are located after each other seen in the flow direction and include at least three coils, two of which are receiver coils connected for counteraction and one of which is a transmitter coil or alternatively two of which are transmitter coils connected for counteraction and one of which is a receiver coil, the transmitter coil or alternatively the receiver coil being located between the two coils connected for counteraction seen in the flow direction. The signal processing suitably is performed in accordance with the above-mentioned second and third main principles, respectively, the adjustment to give a balanced basic measurement signal suitably being performed while the liquid electrically conducting material is in position although not flowing.

According to a second main alternative, the coils are arranged essentially coaxially in association with and preferably within a wall, the axes of the coils being directed into the container, channel or the like, preferably substantially at right angles to the boundary surface between the wall and the liquid electrically conducting material. In this case, the coils can be arranged, for instance, after each other or within each other seen in the axial direction, at least partially outside each other (for instance two coils connected in opposition and seen in the axial direction laying after each other inside or outside a third coil) or substantially in one and the same plane (for instance spirally within each other).

When measuring level (that is, the wall is vertical in principle), preferably three coils are used, two of which are connected for counteraction and are arranged symmetrically relative to the third coil. In this case it is possible to use two receiver coils connected for counteraction or two transmitter coils connected for counteraction, the signal processing being performed in accordance with the above-mentioned second and third main principles, respectively.

When measuring distance (particularly wear and erosion but also for instance the distance from a roof wall to a liquid electrically conducting material therebelow), preferably the same coil arrangement and signal processing as above when measuring level are used.

When measuring rate or velocity, preferably the same coil arrangement and signal processing as above when measuring level are also used.

In all cases the adjustment to provide a balanced basic measurement signal suitably is performed in a way corresponding to that of the first main alternative.

However, it should be pointed out that in connection with the second main alternative it is quite possible to use coils connected for coaction in combination with a signal processing according to the above-mentioned first main principle for measuring level, distance or rate or velocity, although the measurement signals obtained in such a case as a rule will be smaller at equivalent coil arrangements. The above-mentioned adjustment suitably is performed in the same way as stated above.

From the foregoing presentation it will be clearly seen that in accordance with the present invention it has been made possible while using a set of simple standard components to provide a measurement of an optional quantity of a number of predetermined quantities in connection with liquid electrically conducting material, in various applications and under various conditions. In other words, according to the present invention there is provided an arrangement having extremely good flexibility and adaptability to various measuring purposes.

The invention will now be described in more detail by way of examples while referring to the accompanying drawings, in which FIGS. 1-4 show schematic block diagrams of four different embodiments of an arrangement in accordance with this invention;

FIG. 5 is a schematic vertical partial view of a wall of a furnace or a mould and illustrates the position of measurement coils arranged in the wall in accordance with the invention, the view being taken along line V—V of FIG. 6;

FIG. 6 is a schematic vertical partial sectional view taken along the line VI—VI of FIG. 5 and further illustrating how the measurement coils are arranged in the wall of the furnace or the mould;

FIG. 7 shows a cross-section through a coil lead;

FIGS. 8 and 9 are a schematic vertical partial view and a schematic vertical partial sectional view, respectively, of the same kind as in FIGS. 5 and 6 and illustrate another arrangement of the measurement coils according to the invention;

FIG. 10 is a schematic partial sectional view illustrating an arrangement of measurement coils according to the invention with regard to a channel for flowing electrically conducting material;

FIG. 14 schematically shows the configuration of a circuit for phase and amplitude adjustment in accordance with this invention.

Figure 13:
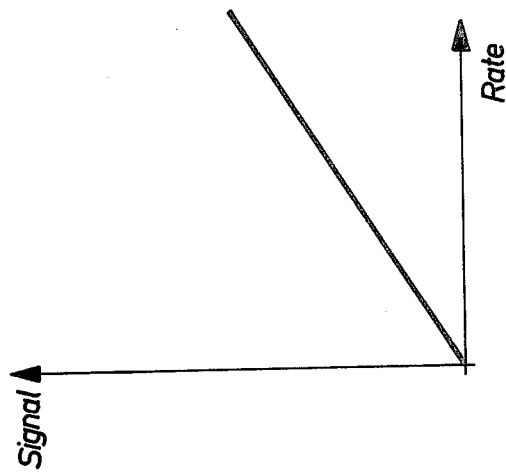
FIGS. 11-13 show various curves illustrating the dependency of the measurement signal on the measured quantity at various embodiments of the invention.

Referring now to FIG. 1, there is shown a schematic block diagram of an embodiment of an arrangement according to the invention for signal processing in accordance with the second main principle. The arrangement comprises a transmitter coil 1 and two receiver coils 2 and 3 connected for counteraction. The transmitter coil 1 is connected to an AC power supply 4 via an amplifier 5 and a current sensing circuit 6, said circuit controlling the amplifier 5 via a feed-back line 7 so that the transmitter coil 1 is supplied with a constant current strength. The receiver coil 2 is connected to the input of a first signal channel 9, the output of which is connected to one of the Inputs of a signal combining circuit 10. The receiver coil 3 is connected to the input of a second signal channel 11, the output of which is connected to the other input of the circuit 10. The circuit channels each includes in series an input amplifier 12, a circuit 13 for controlable phase and amplitude adjustment of the receiver signal from the associated receiver coil transferred by the signal channel and a high pass filter 14 designated for passing signals having the selected operating frequency. The circuit 10 is arranged to produce a signal being the difference between the two transferred receiver signals and constituting a measurement signal. The measurement signal obtained from the circuit 10 is fed to a monitoring and evaluating circuit 15.

All of the circuits or components included in the arrangement of FIG. 1 are well known to those skilled in the art and, therefore, need not be described in more detail. However, for elucidating and exemplifying purposes the following is to be added.

Since receiver coils having a single turn or a few turns are used and the signal obtained is very low, suitably the input amplifiers 12 are provided with an input transformer having a suitable ratio of transformation. In such a case, the inductive reactance of the primary winding of the transformer suitably should be of the same order as the resistance of the associated receiver coil. The transformer is positioned as close to the receiver coil as possible and is thoroughly screened as well as the connection leads between the coil and The transformer and between the transformer and the rest of the input amplifier.

Advantageously, the circuits 13 for phase and amplitude adjustment include adjustable CR circuits in a series combination with amplifiers having adjustable gain. One example thereon is shown schematically in FIG. 14. The circuit 13 shown in said figure thus includes two CR circuits connected in series, each of said circuits consisting of a capacitor C and a variable resistor R, followed by an operational amplifier, the gain of which is controlled by means of a variable feed-back R1. It should be obvious that the phase and amplitude of the signal passed through the circuit 13 can be varied by setting the variable resistors R and R1.

The combining circuit 10 can quite simply consist of an amplifier having two inputs. If the receiver signals transferred by the signal channels and applied to the combining circuit are in phase opposition, this being the case for instance of the signals induced in the receiver coils 2 and 3 which have opposite directions and if the signal channels 9 and 10 are arranged when in a basic condition to give no essential difference with regard to the mutual phase conditions of the transferred signals, then the amplifier can be arranged for adding the supplied signals to produce the desired difference signal. On the other hand, if the supplied receiver signals transferred by the signal channels are not in phase opposition, then instead the amplifier can be arranged for subtracting the applied signals for producing the desired difference signal.

In the simplest case the monitoring and evaluating circuit 15 can consist of an instrument showing the magnitude of the measurement signal, suitably after having been rectified. However, said circuit can include specific circuits 17 to monitor or follow variations of the magnitude of the measurement signal, for instance in order to alarm when the magnitude exceeds or drops below a certain value or in order to provide a control signal for controlling an operation which is dependent on the measured quantity. Also, the circuit 17 can include a micro computor arranged for processing measurement signal data obtained. For instance, the micro computor can be arranged while measuring a first quantity, such as level, to calculate and watch a second quantity, such as wear and erosion, based upon basic values obtained in connection with the measurement of the first quantity and while using characteristic causes for the variation of the measurement signals.

When using the arrangement of FIG. 1 in practice the circuits 13 are adjusted while the liquid electrically conducting material is in a basic position, so that the measurement signal obtained in the circuit 15 becomes as low as possible, preferably zero if possible. This means that the arrangement is balanced, that is, the influence of external disturbing interference fields and of electrically conducting material which can be found in the surroundings in addition to that being measured has been removed. Now, the latter material can be brought or relieved into measuring position, whereby the measured quantity will vary and the resulting unsymmetry of the alternating magnetic fields in the receiver coils which produce very small induced receiver signals which can be accurately detected.

Referring now to FIG. 2, there is shown a schematic block diagram of an embodiment of an arrangement according to the invention for signal processing in accordance with the previously mentioned third main principle. The arrangement comprises two transmitter coils 21 and 22 connected for counteraction and one receiver coil 23. The transmitter coil 21 is supplied from an AC power supply 4 via a first signal channel 25 and the transmitter coil 22 is supplied from the AC power supply via a second signal channel 27. The signal channels each includes an amplifier 5, a circuit 13 for controlable phase and amplitude adjustment of the transmitter signal transferred by each signal channel and a current sensing circuit 6, said circuit 6 controlling the amplifier 5 via a feed-back line 7 so that the associated transmitter coil is supplied with a constant current strength. A feedback can be switched on and off so that the operation for keeping a constant current strength can be made operative after the circuit 13 has been adjusted as desired. The receiver coil 23 is connected to an input amplifier 12, the amplifier 12 being connected to a monitoring and evaluating circuit 15 via a high pass filter 14.

The transmitter coils 21 and 22 are arranged to produce opposite alternating magnetic fields in the receiver coil 23. With regard to the rest of the circuits and components as well as with regard to the adjustment of the basic measurement signal, analogous conditions to those stated above in connection with FIG. 1 apply.

Referring now to FIG. 3, there is shown a schematic block diagram of an embodiment of an arrangement according to the invention for signal processing in accordance with the previously mentioned first main principle. The arrangement comprises one transmitter coil 31 and two receiver coils 32 and 33 connected for coaction (by means of a direct series connection). The transmitter coil 31 is connected to an AC power supply 4 via an amplifier 5 and a current sensing circuit 6, said circuit 6 controlling the amplifier 5 via a feed-back line 7 so that the transmitter coil 31 is supplied with a constant current strength. The series-connected receiver coils 32, 33 are connected to the input of a first signal channel 35, the output of which is connected to one of the two inputs of a signal combining circuit 10. The input of a second signal channel 37 is connected to the AC power supply 4, the output of said second signal channel being connected to the other input of the signal combining circuit 10. The signal channels each includes an amplifier 12, a circuit 13 for controlable phase and amplitude adjustment of the signal transferred by each signal channel and a high pass filter 14. The amplifier 12 of the signal channel 35 has the nature of an input amplifier. The circuit 10 is arranged to produce a difference which is supplied to a monitoring and evaluating circuit 15.

With regard to the circuits and components used, as well as with regard to the adjustment of the basic measurement signal, analogous conditions to those stated above in connection with FIG. 1 apply.

Referring now to FIG. 4, there is shown a schematic block diagram of an embodiment of an arrangement according to the invention for simultaneous signal processing in accordance with the previously mentioned first and second main principles, thus, the arrangement is intended for measuring two quantities, for instance level and wear and erosion in connection with a vertical wall of a container or rate or velocity and wear or erosion in connection with a channel. The arrangement substantially is a combination of the arrangements of FIGS. 1 and 3. Thus, the arrangement comprises a transmitter coil 41 and two receiver coils 42 and 43. The transmitter coil is supplied with a constant current from an AC power supply 4 in the same way as described above. The signals of the receiver coils are fed to a first combining circuit 10 producing a difference signal via associated signal channels 45 and 47 in the same way as in the arrangement of FIG. 1. The first combining circuit 10 is followed by a first monitoring and evaluating circuit 15 for an obtained first measurement signal relating to a first measurement quantity. The receiver signal transferred by the signal channels 45 and 47 are also fed to a second combining circuit 48 for producing a sum signal. In the same way as in the arrangement of FIG. 3 the sum signal obtained is combined in a third combining circuit 10' with a signal transferred from the AC power supply 4 via a third signal channel 49 for producing a second difference signal representing a second measurement signal. The combining circuit 10' is followed by a second monitoring and evaluating circuit 15' for said second measurement signal.

With regard to the circuits and components used, analogous conditions to those stated above in connection with FIGS. 1 and 3 apply.

The arrangement of FIG. 4 is adjusted or balanced in two steps. In a first basic position the circuits 13 of the signal channels 45 and 47 are adjusted so that a first basic measurement signal is obtained from the circuit 10. Thereafter, the circuit 13 of the signal channel 49 is adjusted so that a second basic measurement signal is obtained from the circuit 10'. This second adjustment is performed either in said first basic position or in another position suitable with regard to the measuring purpose. Said other position can be a normal position when measuring the first quantity.

Referring now to FIGS. 5 and 6, said figures schematically show an example on a coil arrangement according to the invention arranged in a vertical wall of a mould for molten metal 50. The coil arrangement comprises three substantially planar rectangular single turn coils 51, 52 and 53, the coils being arranged vertically one above the other at the transition zone between the outer insulation 55 of the wall and an inner lining consisting of bricks 56. Thus, the coils are located substantially in the same plane with their longer sides or portions substantially horizontally. In order to make the installation easier, the coils are arranged so that their longer and shorter sides or portions coincide with the joints between the bricks 56. The connection leads 57, 58 and 59 of the coils 51, 52 and 53, respectively, are passed directly out through the insulation 55 and the outer steel casing 60 of the mould from one corner of each of the coils in any suitable way (not shown). Suitably, the connection leads are direct extensions of the coil lead. Outside the mould the connection leads are connected to conventional leads for connection to the terminals of the circuits of the arrangement.

A typical size of the coils is 0.1 × 0.3 m and the coils are typically arranged with a mutual vertical distance of the order of 0.2 m, that is, the coils are typically separated by one brick row.

Referring now to FIG. 7, there is shown a cross-section through a side or portion of any of the coils 51, 52 53 disclosing a specific construction of the coil lead in accordance with the invention. Thus, the coil lead includes an inner wire 71 of a high temperature resistive material, for instance "Kanthal", a high temperature resistive insulation 72 of a ceramic material and surrounding said wire and an outer sheath of a high temperature resistive electrically conducting material, for instance chromium, nickel or stainless steel. In this way there is obtained a coil which is most insensitive to influence in a general sense and which is mechanically rigid and, consequently, easy to handle and in which the very conductor runs little risk of being influenced or undergoing a change. The sheath 73 which screens off electrical disturbances can be grounded at one end. Typical dimensions of a coil lead according to FIG. 7 are as follows:

Transmitter coil:
    Diameter of inner conductor 2 mm
    Inner diameter of sheath 4 mm
    Outer diameter of sheath 5 mm
Receiver coil:
    Diameter of inner conductor 0.5 mm
    Inner diameter of sheath 2 mm
    Outer diameter of sheath 3 mm An alternative insulation is for instance a $SiO_2$ mantle soaked with $Al_2O_3$.

Figure 11:
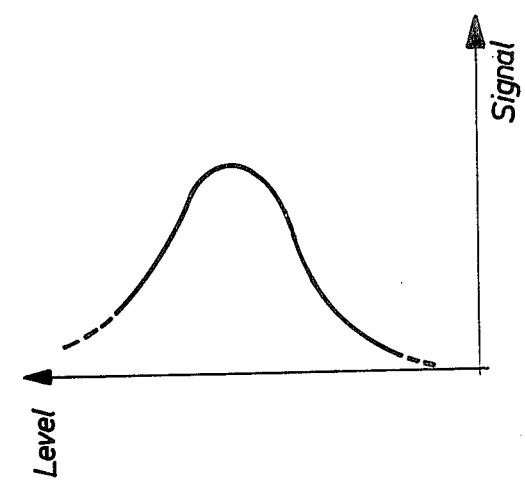

The coil arrangement of FIGS. 5 and 6 is preferably used for measuring the level of the molten metal 50 contained in the mould. When used in an arrangement according to FIG. 1 or 2, for instance, the coils 52 and 53 constituting the coils connected for counteraction, then the typical dependency of the magnitude of the measurement signal on the level of the melt shown in FIG. 11 is obtained. The top value of the measurement signal is obtained when the surface of the molten metal is straight before the centre coil 51, as illustrated in FIG. 6, It should be understood that the top value of the measurement signal will increase as the wear and erosion of the bricks 56 proceeds. This makes it possible to determine also the degree of wear and erosion on a large scale quite simply by measuring the top value of the measurement signal. In the simplest case this can be performed by means of a simple measuring instrument which also can be a measuring instrument included in the monitoring and evaluating circuit of the arrangement.

Referring now to FIGS. 8 and 9, said figures schematically show another example on a coil arrangement according to the invention arranged in a vertical wall of the same kind as in FIGS. 5 and 6. The coil arrangement includes three coils 81, 82 and 83 of the same configuration as in the example of FIGS. 5 and 6. However, in this case the coils are arranged coaxially in the lining of bricks 56, the coils being separated in the axial direction. The coils are located in the joints between the bricks 56. With regard to the connection leads of the coils analogous conditions to those stated above in connection with FIGS. 5 and 6 apply.

Figure 12:
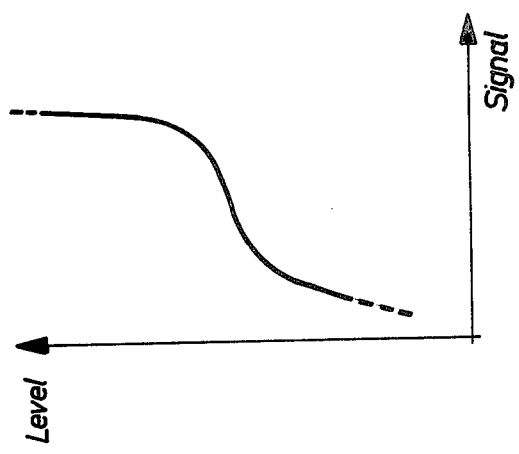

The coil arrangement of FIGS. 8 and 9 also is used preferably for measuring level in connection with an arrangement according to FIG. 1 or FIG. 2. The typical dependency of the magnitude of the measurement signal on the level of the melt obtained in this context can be seen from the curve shown in FIG. 12. At the level corresponding to the point of inflexion of the curve the surface of the melt 50 coincide with the axes of the coils, as illustrated in FIG. 9.

Referring now to FIG. 10 there is schematically shown still another example of a coil arrangement according to the invention which is suitable for measuring the flow of liquid electrically conducting material 100 in an open channel defined by two vertical side walls 101 and 102 and a bottom wall 103. A rectangular transmitter coil 104 is arranged adjacent and at the outside of side wall 101 and two rectangular receiver coils 105 and 106 are arranged adjacent and at the outside of side wall 102. All of the coils include one single turn and are made of the coil lead described with reference to FIG. 7. The receiver coils 105 and 106 are located opposite to the transmitter coil 104, each of the coils having a size equal to one half of the transmitter coil. The receiver coils are made of an unbroken coil lead wound so as to form two coils connected in opposition.

The inner conductors of the coils are preferably connected to a measuring arrangement according to FIG. 1. The typical linear dependency of the magnitude of the measurement signal on the flow rate obtained in this case can be seen from the curve shown in FIG. 13. If the measuring frequency and the size of the coils are suitably chosen, then the magnitude of the measurement signal can be made independent of the flow cross section, that is merely dependent on the actual volume flow.

Finally, the following additional typical guiding values can be given for an arrangement according to the invention:
Resistance of transmitter coil: of the order of 1–10 Ω
Current through transmitter coil: of the order of 1–10 A
Resistance of receiver coil: of the order of 1–100 Ω
Output voltage of single turn receiver coil: of the order of 0.1–1 mV

What is claimed is:

1. An arrangement for electro-magnetic measurement at high temperature of at least one parameter of a liquid electrically conducting material contained in a container, comprising:
    an AC power supply for supplying a transmitter signal,
    at least one transmitter coil arranged to be supplied with a transmitter signal from the AC power supply for producing an alternating magnetic field,
    at least one receiver coil arranged to sense the alternating magnetic field and to generate a receiver signal in dependence thereon,
    said coils being arranged in association with a wall of said container so that the alternating magnetic field sensed by a receiver coil varies in accordance with said parameter, means connected to said at least one receiver coil for detecting said receiver signal to produce a measurement signal,
    wherein said coils are coreless transmitter and receiver coils which are essentially freely positionable and have at most a relatively few number of turns,
    at least two signal channels, each of said signal channels being arranged to transfer one of said transmitter and receiver signals, and at least one of said signal channels including signal processing means for adjustment of at least one parameter of the signal transferred by the signal channel to balance the transferred signal and remove disturbing signals,
    and means for producing counteraction between the signals transferred by the signal channels so that when the liquid electrically conducting material is in a basic position and when said signal processing means are properly adjusted the basic measurement signal obtained is at least substantially balanced with regard to disturbing and unbalance signals.

2. An arrangement according to claim 1, characterized in that the transmitter and receiver coils are separate.

3. An arrangement according to claim 2, characterized in that said transmitter and receiver coils are electrically screened.

4. An arrangement according to claim 1, characterized in that said transmitter and receiver coils are electrically screened.

5. An arrangement according to claim 4, characterized in that the conductors of said transmitter and receiver coils are encased in a metal sheath while being insulated, the metal sheath being non-short-circuiting.

6. An arrangement according to claim 4, characterized in that one signal channel is arranged to transfer the transmitter signal to a first transmitter coil, in that the other signal channel is arranged to transfer the transmitter signal to a second transmitter coil and in that said means for producing counteraction include means for providing the transmitter coils with such a transmitter signal supply that the alternating magnetic fields produced thereof counteract each other in said at least one receiver coil.

7. An arrangement according to claim 4, characterized in that said arrangement comprises at least three signal channels, wherein two of said three signal channels are arranged to transfer a signal of the same type, at least one of said two signal channels including signal processing means, and the third signal channel is arranged to transfer a transmitter signal from the transmitter side of the arrangement, said third signal channel including signal processing means, further including first means for producing counteraction between the signals transferred by said third signal channel and a signal obtained from said at least one receiver coil for measurement of a second parameter.

8. An arrangement according to claim 1, characterized in that the conductors of said transmitter and receiver coils are encased in a metal sheath while being insulated, the metal sheath being non-short-circuiting.

9. An arrangement according to claim 8, characterized in that one signal channel is arranged to transfer the transmitter signal to a first transmitter coil, in that the other signal channel is arranged to transfer the transmitter signal to a second transmitter coil and in that said means for producing counteraction include means for providing the transmitter coils with such a transmitter signal supply that the alternating magnetic fields produced thereof counteract each other in said at least one receiver coil.

10. An arrangement according to claim 1, characterized in that said means for producing counteraction and said means for producing a measurement signal include combining means for combining the signals transferred by the signal channels and processed in at least one of the signal channels so that a difference signal representing a measurement signal is obtained.

11. An arrangement according to claim 10, characterized in that at least one first signal channel is arranged to transfer a receiver signal from at least one receiver coil and in that a second signal channel is arranged to transfer a transmitter signal from the transmitter side of the arrangement.

12. An arrangement according to claim 11, characterized in that the arrangement comprises adding means for adding signals generated in at least two receiver coils and transferred by two first signal channels to produce a composite receiver signal.

13. An arrangement according to claim 12, characterized in that said adding means include means for signal-wise coactingly connecting said at least two receiver coils.

14. An arrangement according to claim 11, characterized in that said arrangement comprises subtracting means for subtracting signals generated in at least two receiver coils and transferred by two first signal channels to produce a composite receiver signal.

15. An arrangement according to claim 14, characterized in that said subtracting means include means for signal-wise counteractingly connecting said at least two receiver coils.

16. An arrangement according to claim 11, characterized in that said arrangement comprises at least three signal channels, wherein two of said three signal channels are arranged to transfer a signal of the same type, at least one of said two signal channels including signal processing means, and the third signal channel is arranged to transfer a transmitter signal from the transmitter side of the arrangement, said third signal channel including signal processing means, further including first means for producing counteraction between the signals transferred by said two signal channels for balanced measurement of a first parameter and second means for producing counteraction between the transmitter signal transferred by said third signal channel and a signal obtained from at least one receiver coil for measurement of a second parameter.

17. An arrangement according to claim 16, wherein a first signal channel is arranged to transfer a first receiver signal from at least one first receiver coil, a second signal channel is arranged to transfer a second receiver signal from at least one second receiver coil and said first means for producing counteraction and said means for producing a measurement signal comprise first combining means for combining said transferred first and second receiver signals, so that a first difference signal representing a first measurement signal regarding a first parameter is obtained, and means for adding said first and second receiver signals for producing a sum signal, and said second means for producing counteraction includes second combining means for combining the transferred transmitter signal and said sum signal, so that a second difference signal representing a measurement signal regarding a second parameter is obtained.

18. An arrangement according to claim 10, characterized in that a first signal channel is arranged to transfer a first receiver signal from at least one first receiver coil and in that a second signal channel is arranged to transfer a second receiver signal from at least one second receiver coil.

19. An arrangement according to claim 1, characterized in that one signal channel is arranged to transfer the transmitter signal to a first transmitter coil, in that the other signal channel is arranged to transfer the transmitter signal to a second transmitter coil and in that said means for producing counteraction include means for providing the transmitter coils with such a transmitter signal supply that the alternating magnetic fields produced thereof counteract each other in said at least one receiver coil.

20. An arrangement according to claim 19, characterized in that the coils are arranged in a wall of said container.

21. An arrangement according to claim 20, characterized in that the coils are arranged with their axes directed into the container.

22. An arrangement according to claim 1, characterized in that said arrangement comprises at least three signal channels, wherein two of said three signal channels are arranged to transfer a signal of the same type, at least one of said two signal channels including signal processing means, and the third signal channel is arranged to transfer a transmitter signal from the transmitter side of the arrangement, said third signal channel including signal processing means, further including first means for producing a counteraction between the signals transferred by said two signal channels for balanced measurement of a first parameter and second means for producing a counteraction between the transmitter signal transferred by said third signal channel and a signal obtained from said at least one receiver coil for measurement of a second parameter.

23. An arrangement according to claim 22, wherein a first signal channel is arranged to transfer a first receiver signal from at least one first receiver coil, a second signal channel is arranged to transfer a second receiver signal from at least one second receiver coil and said first means for producing counteraction and said means for producing a measurement signal comprise first combining means for combining said transferred first and second receiver signals, so that a first difference signal representing a first measurement signal regarding a first parameter is obtained, and means for adding said first and second receiver signals for producing a sum signal, and said second means for producing a counteraction includes second combining means for combining the transferred transmitter signal and said sum signal, so that a second difference signal representing a measurement signal regarding a second parameter is obtained.

24. An arrangement according to claim 23, characterized in that said adding means include third combining means for combining the transferred first and second receiver signals so that a sum signal is obtained.

25. An arrangement according to claim 23, characterized in that said adding means include transformer means for signalwise coactingly connecting said first and second receiver signals.

26. An arrangement according to claim 22, characterized in that said means for producing counteraction are arranged for controlled provision of such counteraction, wherein said first means for comprises first controlled means for disabling the signal transferred by the third signal channel and said second means producing counteraction includes second controlled means for changing said counteraction into opposite coaction, so that a first parameter is measured when the liquid material is in a first basic position and said signal processing means of said two signal channels are properly adjusted so that a first basic measurement signal relating to said first parameter is substantially balanced, and so that a second parameter is measured when the liquid material is in a second basic position and said signal processing means of said third signal channel are properly adjusted so that a second basic measurement signal relating to said second parameter is substantially balanced.

27. An arrangement according to claim 26, characterized in that said second means for producing counteraction and said means for producing a measurement signal include first combining means for combining the signal transferred by the third signal channel and the signal obtained from said at least one receiver coil, said first controlled means being arranged to disable the signal transferred by the third signal channel selectively so that the measurement signal merely depends on the signal obtained from said at least one receiver coil.

28. An arrangement according to claim 27, characterized in that a first signal channel is arranged to transfer a first receiver signal from at least one first receiver coil, a second signal channel is arranged to transfer a second receiver signal from at least one second receiver coil and said first means for producing counteraction and said means for producing a measurement signal comprise second combining means for combining said transferred first and second receiver signals to produce said signal obtained from said at least one receiver coil.

29. An arrangement according to claim 1, characterized in that the coils are arranged in a wall of said container.

30. An arangement according to claim 29, characterized in that the coils are arranged within an inner refractory lining.

31. An arrangement according to claim 29, characterized in that the coils are substantially planar.

32. An arrangement according to claim 31, characterized in that the coils are arranged separated relative each other so that they do not overlap each other.

33. An arrangement according to claim 32, characterized in that the axes of the coils coincide.

34. An arrangement according to claim 29, characterized in that the coils are arranged separated relative each other so that they do not overlap each other.

35. An arrangement according to claim 29, characterized in that the axes of the coils coincide.

36. An arrangement according to claim 1, characterized in that the coils are arranged with their axes directed into the container.

37. An arrangement according to claim 36, characterized in that the axes of the coils are substantially parallel.

38. An arrangement according to claim 36, characterized in that the coils are substantially planar.

39. An arrangement according to claim 38, characterized in that the coils are arranged separated relative each other so that they do not overlap each other.

* * * * *